(12) United States Patent
Sawanobori (10) Patent No.: US 11,852,954 B2
(45) Date of Patent: Dec. 26, 2023

(54) BLADE OPEN-CLOSE DEVICE AND ELECTRONIC DEVICE

(71) Applicant: Nidec Copal Corporation, Tokyo (JP)

(72) Inventor: Koji Sawanobori, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 71 days.

(21) Appl. No.: 17/477,533

(22) Filed: Sep. 17, 2021

(65) Prior Publication Data

US 2022/0091479 A1 Mar. 24, 2022

(30) Foreign Application Priority Data

Sep. 23, 2020 (JP) .................................. 2020-158877

(51) Int. Cl.
*G03B 11/04* (2021.01)
*G06F 1/16* (2006.01)

(52) U.S. Cl.
CPC .......... *G03B 11/043* (2013.01); *G06F 1/1686* (2013.01); *G06F 1/1616* (2013.01); *G06F 1/1679* (2013.01)

(58) Field of Classification Search
CPC .................................................. G03B 11/043
See application file for complete search history.

(56) References Cited

U.S. PATENT DOCUMENTS

| | | | | |
|---|---|---|---|---|
| 5,619,296 A | * | 4/1997 | Furlani | G03B 9/14 396/257 |
| 2004/0239797 A1 | | 12/2004 | Masuda | |
| 2007/0201866 A1 | * | 8/2007 | Kihara | G03B 9/18 396/468 |
| 2009/0295983 A1 | | 12/2009 | Sekimoto et al. | |
| 2010/0200751 A1 | * | 8/2010 | Zahn | H04N 5/2251 250/330 |
| 2018/0352133 A1 | | 12/2018 | Yoneda et al. | |

FOREIGN PATENT DOCUMENTS

| | | |
|---|---|---|
| JP | H550438 U | 7/1993 |
| JP | 2004348051 A | 12/2004 |
| JP | 2009288327 A | 12/2009 |
| JP | 2012226242 A | 11/2012 |
| JP | 2017146484 A | 8/2017 |
| WO | 2017104265 A1 | 6/2017 |

\* cited by examiner

*Primary Examiner* — Noam Reisner
(74) *Attorney, Agent, or Firm* — HAUPTMAN HAM, LLP (57) ABSTRACT

A blade open-close device retains a blade at a predetermined position under an external load. A blade open-close device includes a base, a cover plate covering part of the base, and a blade located between the base and the cover plate. The blade is movable between a closing position to cover an opening in the cover plate and an opening position to uncover the opening. The blade open-close device further includes an actuator that moves the blade between the opening position and the closing position, a stopper movable between a lock position at which a protrusion on the stopper is on a path of the blade and an unlock position at which the stopper is entirely retracted from the path when the blade is at the opening position and when the blade is at the closing position, and a voice coil motor that moves the stopper from the lock position toward the unlock position.

4 Claims, 6 Drawing Sheets

BLADE OPEN-CLOSE DEVICE AND ELECTRONIC DEVICE

RELATED APPLICATIONS

The present application claims priority to Japanese Application Number 2020-158877, filed Sep. 23, 2020, the disclosure of which is hereby incorporated by reference herein in its entirety.

BACKGROUND

Technical Field

The present invention relates to a blade open-close device and an electronic device, and particularly, to a blade open-close device for covering and uncovering an opening with a blade.

Description of the Background

Recent electronic devices, such as smartphones, smart speakers, and drones, incorporate cameras. Such a camera typically has a lens aperture constantly uncovered, or being constantly ready for image capturing. In this state, the camera may be operated by a malicious third party, possibly capturing images or videos unintended by the user. Such images or videos can be used for crime.

In particular, electronic devices incorporating cameras are now often connected to a network such as the Internet. The connected electronic devices may be operated remotely by a malicious program without being noticed by the user. When the electronic device is operated remotely, image capturing may be performed without being noticed by the user, possibly allowing the camera to capture images or videos for transmission to external devices. For privacy protection of the user, structures are awaited for shielding against image capturing with a camera as unintended by the user.

Such structures for shielding against image capturing with a camera may include a known camera shutter that opens and closes a blade between a lens and a subject (refer to, for example, Patent Literature 1). However, the blade may open unintentionally under an external load such as external vibration or impact. In this case, shielding cannot be achieved against image capturing with a camera.

CITATION LIST

Patent Literature

Patent Literature 1: Japanese Unexamined Patent Application Publication No. 2009-288327

BRIEF SUMMARY

In response to the above issue, one or more aspects of the present invention are directed to a blade open-close device that retains a blade at a predetermined position under an external load and to an electronic device including the blade open-close device.

A blade open-close device according to one aspect of the present invention retains a blade at a predetermined position under an external load. The blade open-close device includes a base having a housing space housing a lens unit, a cover plate covering at least part of the base, and a blade located between the base and the cover plate. The cover plate has an opening aligned with an optical axis of the lens unit. The blade is movable between a closing position to cover the opening and an opening position to uncover the opening. The blade open-close device further includes an actuator that moves the blade between the opening position and the closing position, a stopper movable between a lock position at which at least part of the stopper is on a path of the blade or the actuator and an unlock position at which the stopper is entirely retracted from the path at least when the blade is at the opening position or when the blade is at the closing position, and a voice coil motor that moves the stopper at least from the lock position toward the unlock position.

DETAILED DESCRIPTION

A blade open-close device according to one or more embodiments of the present invention will now be described in detail with reference to FIGS. 1 to 9. In FIGS. 1 to 9, the same or corresponding components are given the same reference numerals, and will not be described repeatedly. In FIGS. 1 to 9, the scale and dimensions of each component may be exaggerated, or one or more components may not be shown. Unless otherwise specified, the terms such as first and second will be used simply to distinguish the components and will not represent a specific order or sequence.

Figure 1:
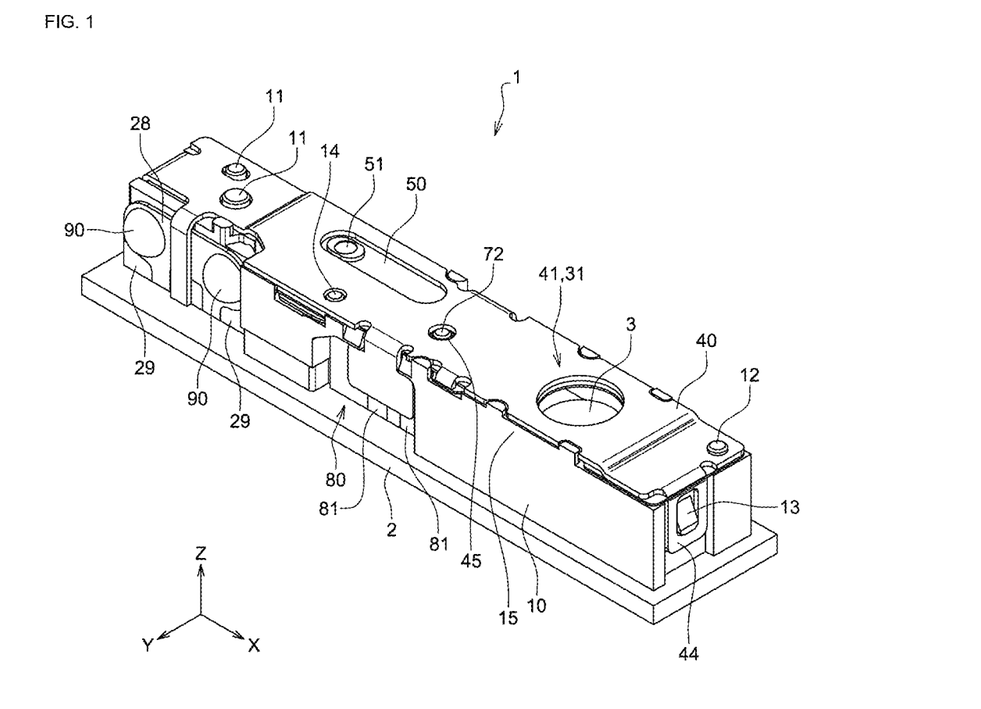
FIG. 1 is a perspective view of a blade open-close device according to one embodiment of the present invention, together with a module board and a lens unit.
Figure 2:
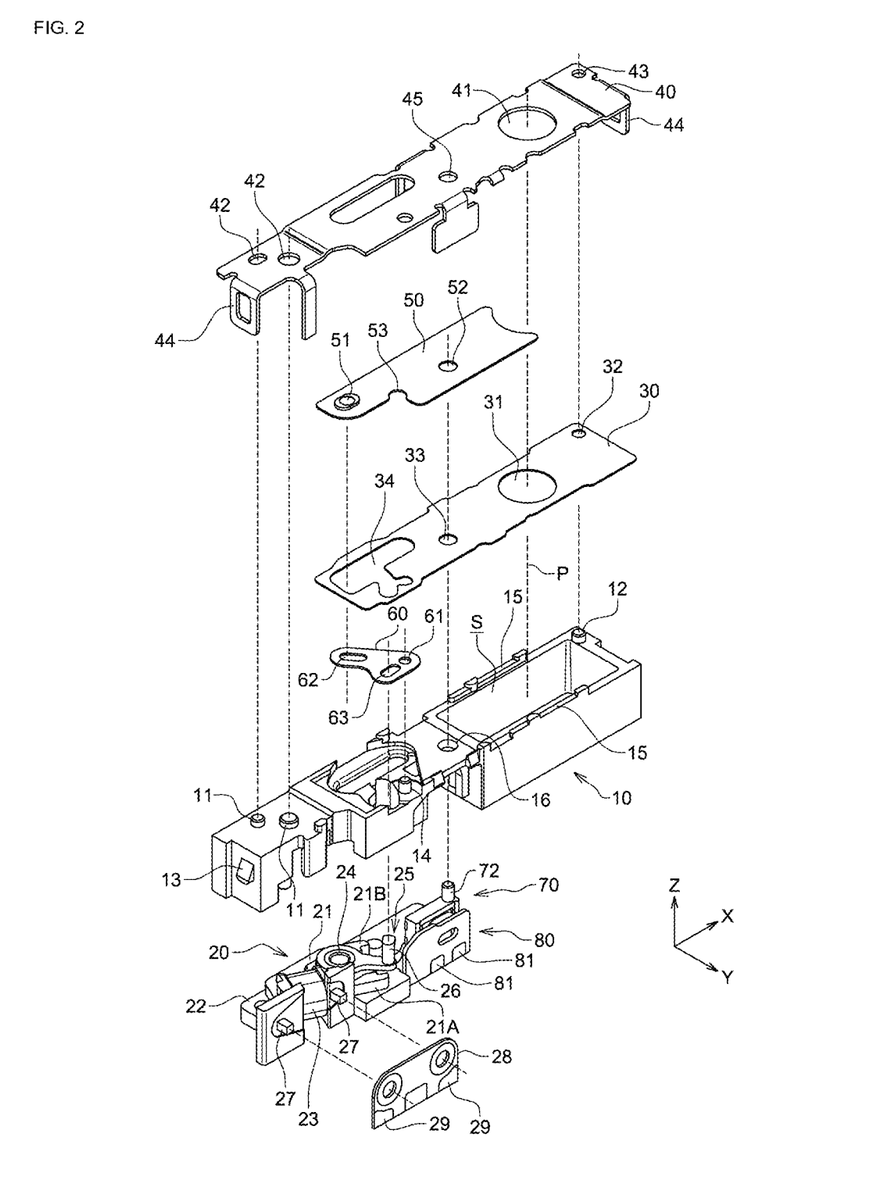
FIG. 2 is an exploded perspective view of the blade open-close device in FIG. 1.
Figure 3:
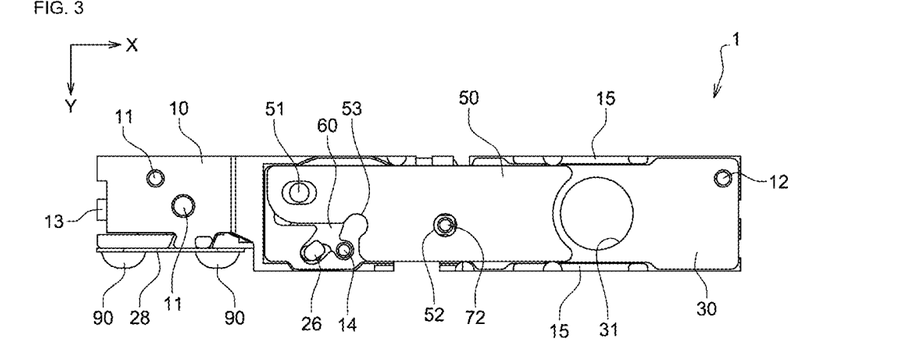
FIG. 3 is a plan view of the blade open-close device in FIG. 1 with a cover plate being removed.
Figure 4:
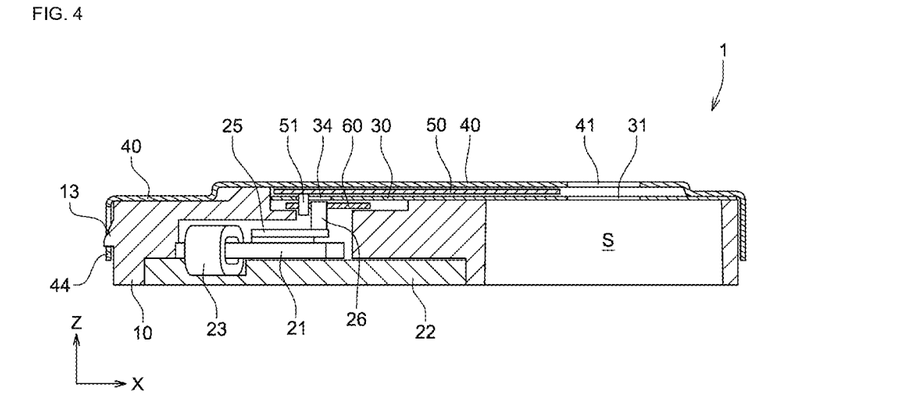
FIG. 4 is a schematic cross-sectional view of the blade open-close device in FIG. 1, showing its internal structure.

FIG. 1 is a perspective view of a blade open-close device 1 according to one embodiment of the present invention. FIG. 2 is an exploded perspective view of the device. FIG. 3 is a plan view of the device with a cover plate being removed. FIG. 4 is a schematic cross-sectional view of the blade open-close device 1, showing its internal structure. The blade open-close device 1 according to the present embodiment is mounted, for example, on a camera module incorporated in an electronic device, and more specifically, on a module board 2 on which a lens unit 3 is mounted. For ease of explanation in the present embodiment, up or upward refers to the positive Z-direction in FIG. 1, and down or downward refers to the negative Z-direction.

As shown in FIGS. 1 to 4, the blade open-close device 1 includes a base 10 attached to the module board 2, an actuator 20 located on the base 10, a partition 30 located on the base 10, a cover plate 40 covering an upper portion of the base 10, a blade 50 located between the cover plate 40 and the partition 30, and a connector 60 connecting the actuator 20 and the blade 50. The base 10 has a substantially rectangular housing space S housing the lens unit 3 (refer to FIG. 1) mounted on the module board 2.

The partition 30 has an opening 31. The cover plate 40 has an opening 41. The openings 31 and 41 are aligned with an optical axis P of the lens unit 3. The opening 31 in the partition 30 functions as an opening (aperture) that determines the amount of light entering the lens unit 3. Thus, the partition 30 may be referred to as an aperture blade. The partition 30 may be eliminated. In this case, the opening 41 in the cover plate 40 functions as the aperture.

The cover plate 40 has multiple pin holes 42 and 43. With pins 11 and 12 located on the base 10 received in the pin holes 42 and 43, the cover plate 40 is attached to the base 10. The cover plate 40 includes hooks 44. With the hooks 44 engaged with engagement tabs 13 located on the base 10, the cover plate 40 is fastened to the base 10. Rather than with the illustrated components, the cover plate 40 may be fastened to the base 10 with, for example, screws.

The partition 30 is located in the positive Z-direction (upward) from the base 10. The partition 30 has a pin hole 32 to receive the pin 12 on the base 10. The connector 60 is located in the negative Z-direction (downward) from the partition 30. The base 10 includes a support shaft 14 extending in Z-direction. The support shaft 14 is received in a shaft hole 61 in the connector 60. With the support shaft 14 on the base 10 received in the shaft hole 61 in the connector 60, the connector 60 is rotatable about the support shaft 14.

The blade 50 is located in the positive Z-direction (upward) from the partition 30. The base 10 includes guides 15 extending in the positive Z-direction from its two edges in Y-direction. The blade 50 is located between the guides 15. The blade 50 is thus movable, in a blade chamber between the partition 30 and the cover plate 40, in X-direction (open-close direction), while being guided by the guides 15 on the base 10.

The actuator 20 includes a yoke 21 formed from a magnetic material, a coil base 22, a coil 23 wound around the yoke 21 and the coil base 22, a rotor magnet 24 rotatably attached to a shaft (not shown) extending in the positive Z-direction from the base 10, and a lever 25 connected to the rotor magnet 24. The yoke 21 in the present embodiment is thin and flat in Z-direction. The yoke 21 is U-shaped and includes two arms 21A and 21B. The coil 23 is wound around the arm 21A. The rotor magnet 24 is located between the arms 21A and 21B of the yoke 21. The rotor magnet 24 includes a magnet having different magnetic poles in the circumferential direction. The lever 25 includes a connecting part 26 extending in the positive Z-direction radially outside the rotor magnet 24.

As shown in FIG. 2, the coil base 22 includes terminals 27 protruding in the positive Y-direction. The ends of the coil 23 are wound around the terminals 27. As shown in FIG. 1, the ends of the coil 23 are fixed to the terminals 27 with, for example, solder joints 90 together with a metal terminal plate 28. The terminal plate 28 extends parallel to an XZ plane and includes connectors 29 at its end adjacent to the module board 2 (in the negative Z-direction). The connectors 29 are electrically connected to contacts on the module board 2 with solder joints (not shown). In this manner, the coil 23 in the actuator 20 is electrically connected to wiring (not shown) in the module board 2 with the terminal plate 28.

Figure 5A:
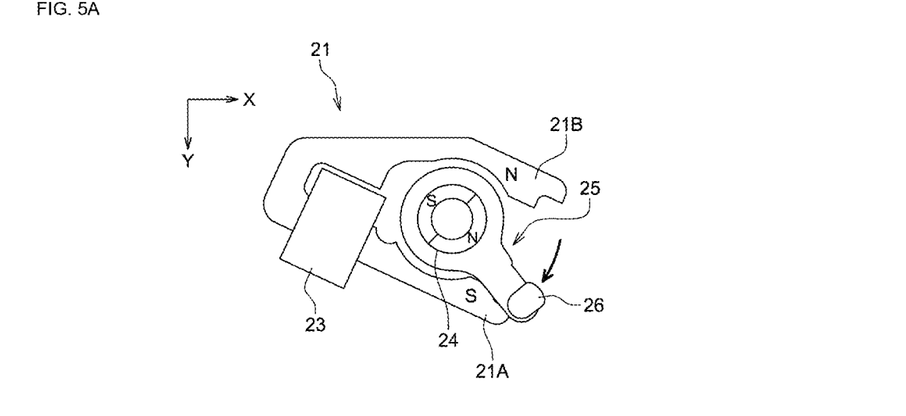
FIG. 5A is a schematic plan view of an actuator shown in FIG. 2, showing its example operation.
Figure 5B:
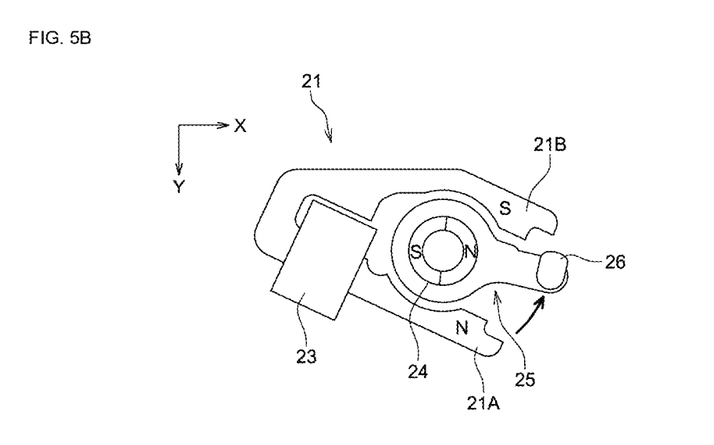
FIG. 5B is a schematic plan view of the actuator shown in FIG. 2, showing its example operation.

FIGS. 5A and 5B are schematic plan views of the actuator 20, each showing its example operation. In the actuator 20 in the present embodiment, when the coil 23 in the actuator 20 is energized with a current through the wiring in the module board 2, the arms 21A and 21B of the yoke 21 are magnetically polarized (magnetized) oppositely to each other. The magnetic forces of the arms 21A and 21B then attract and rotate the rotor magnet 24.

For example, when the coil 23 in the actuator 20 is energized with a current flowing in one direction, the arms 21A and 21B of the yoke 21 are magnetically polarized or magnetized as shown in FIG. 5A. The magnetic poles of the arms 21A and 21B of the yoke 21 attract the respective opposite magnetic poles of the rotor magnet 24, thus rotating the rotor magnet 24 clockwise. This rotates the lever 25 clockwise about the rotor magnet 24.

When the coil 23 in the actuator 20 is energized with a current flowing in a direction opposite to the direction of the current in FIG. 5A, the arms 21A and 21B of the yoke 21 are magnetically polarized as shown in FIG. 5B. The magnetic poles of the arms 21A and 21B of the yoke 21 attract the respective opposite magnetic poles of the rotor magnet 24, thus rotating the rotor magnet 24 counterclockwise. This rotates the lever 25 counterclockwise about the rotor magnet 24.

Referring back to FIG. 2, the connector 60 has a lever engagement hole 63 engaged with the connecting part 26 of the lever 25. The lever engagement hole 63 has a minimum width slightly larger than the outer diameter of the connecting part 26 of the lever 25 in the actuator 20. The connecting part 26 of the lever 25 in the actuator 20 is received in the lever engagement hole 63 in the connector 60. The connecting part 26 of the lever 25 is thus engaged with the lever engagement hole 63 in the connector 60. As the lever 25 rotates about the rotor magnet 24 as described above, the connector 60 rotates about the support shaft 14 on the base 10.

The blade 50 includes an engagement pin 51 extending in the negative Z-direction. The engagement pin 51 is engaged with a pin engagement hole 62 in the connector 60. The pin engagement hole 62 has a minimum width slightly larger than the outer diameter of the engagement pin 51 on the blade 50. The engagement pin 51 extending in the negative Z-direction from the blade 50 is placed through an opening 34 in the partition 30 and received in the pin engagement hole 62 in the connector 60. The engagement pin 51 on the blade 50 is thus engaged with the pin engagement hole 62 in the connector 60. As the connector 60 rotates about the support shaft 14 on the base 10, the engagement pin 51 on the blade 50 moves while being engaged with the pin engagement hole 62 in the connector 60. The blade 50 moves in X-direction as guided by the guides 15 on the base 10 described above.

Figure 6A:
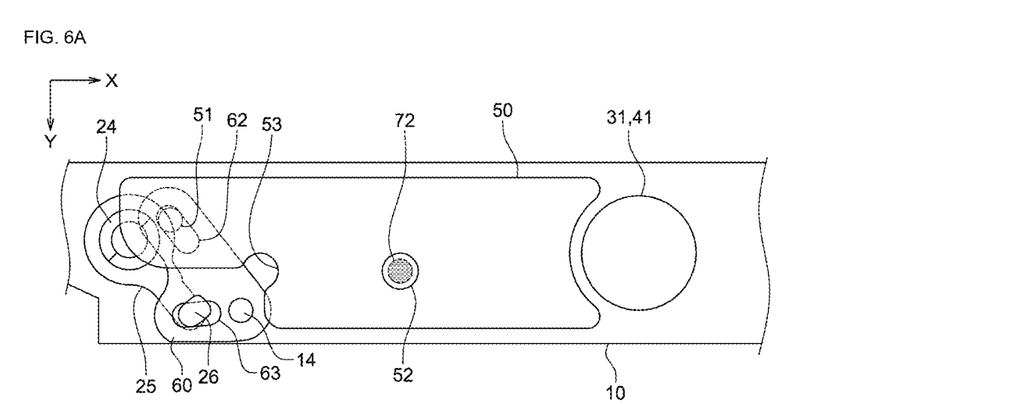
FIG. 6A is a schematic plan view of a blade at a position moved by the actuator shown in FIG. 5A.

FIG. 6A is a schematic plan view of the blade 50 at the position shown in FIG. 1. The blade 50 at this position does not cover the opening 31 in the partition 30 and the opening 41 in the cover plate 40, thus leaving the openings 31 and 41 uncovered. This allows external light to directly enter the lens in the lens unit 3 through the opening 31 in the partition 30 and the opening 41 in the cover plate 40, thus allowing image capturing with the lens unit 3. The position of the rotor magnet 24 and the position of the blade 50 shown in FIG. 6A each are hereafter referred to as an opening position.

Figure 6B:
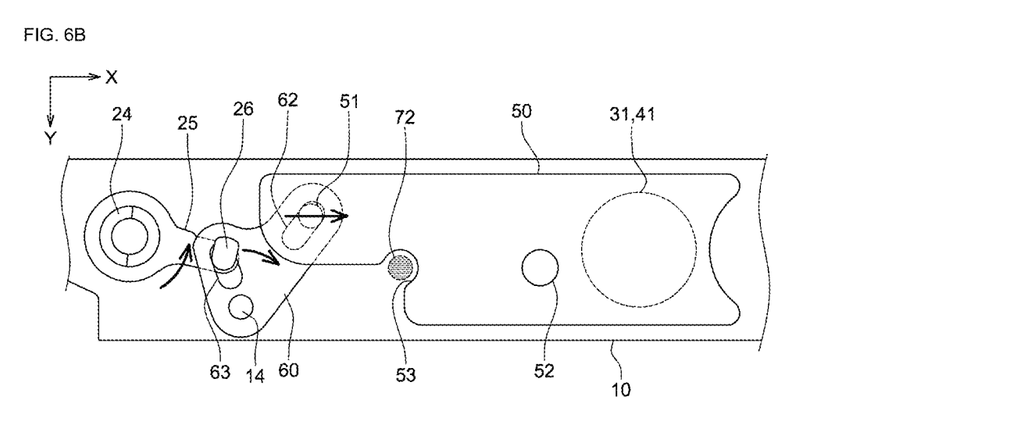
FIG. 6B is a schematic plan view of the blade at a position moved by the actuator shown in FIG. 5B.

When the coil 23 in the actuator 20 is energized in the state shown in FIG. 6A to rotate the rotor magnet 24 counterclockwise, the connector 60 with its lever engagement hole 63 engaged with the connecting part 26 of the lever 25 rotates clockwise about the support shaft 14 as shown in FIG. 6B. As the connector 60 rotates, the blade 50 with its engagement pin 51 engaged with the pin engagement hole 62 in the connector 60 moves in the positive X-direction as shown in FIG. 6B. The blade 50 moving in the positive X-direction covers the opening 31 in the partition 30 and the opening 41 in the cover plate 40. More specifically, the blade 50 at this position is aligned with the optical axis P of the lens unit 3, blocking light passing through the opening 41 in the cover plate 40. The position of the rotor magnet 24 and the position of the blade 50 shown in FIG. 6B each are hereafter referred to as a closing position.

The blade 50 formed from, for example, a material opaque to light to be captured by the lens unit 3 (e.g., visible light and infrared light) blocks light passing through the opening 41 in the cover plate 40 when the blade 50 is at the closing position shown in FIG. 6B, preventing the light from reaching the lens unit 3. In this state, the lens unit 3 in operation is not allowed to capture images or videos. This prevents images or videos unintended by the user from being obtained.

When the coil 23 in the actuator 20 is energized in the state shown in FIG. 6B to rotate the rotor magnet 24 clockwise, the connector 60 with its lever engagement hole 63 engaged with the connecting part 26 of the lever 25 rotates counterclockwise about the support shaft 14. In this state, the blade 50 with its engagement pin 51 engaged with the pin engagement hole 62 in the connector 60 moves in the negative X-direction to the opening position shown in FIG. 6A.

In this manner, the actuator 20 rotates the rotor magnet 24 between the closing position and the opening position with power from the module board 2, thus allowing the blade 50 to move between the closing position and the opening position with the connecting part 26 of the lever 25 and the engagement pin 51 on the blade 50.

In the present embodiment, the yoke 21 is shaped to attract the rotor magnet 24 under the magnetic force from the rotor magnet 24 without any current supply to the coil 23 in the actuator 20. More specifically, when current supply to the coil 23 in the actuator 20 is stopped in the state shown in FIG. 5A, the rotor magnet 24 can remain at the opening position with its magnetic force acting on the yoke 21. Similarly, when current supply to the coil 23 in the actuator 20 is stopped in the state shown in FIG. 5B, the rotor magnet 24 can remain at the closing position with its magnetic force acting on the yoke 21.

In this manner, the yoke 21 can be shaped to prevent the blade 50 from unintentionally moving from the opening position or the closing position or from stopping between the opening position and the closing position without any current supply to the coil 23 in the actuator 20. The yoke 21 may be shaped to retain the rotor magnet 24 at the opening position alone or at the closing position alone. In particular, retaining the rotor magnet 24 at the closing position causes the blade 50 to cover the openings 41 and 31 without any current supply to the coil 23 in the actuator 20. This can prevent images or videos unintended by the user from being obtained.

The blade open-close device 1 according to the present embodiment includes a locking structure that can retain (lock) the blade 50 at the opening position and the closing position. The blade 50 locked at the opening position or the closing position by the locking structure is immovable in X-direction as described above. The locking structure will now be described.

Figure 7:
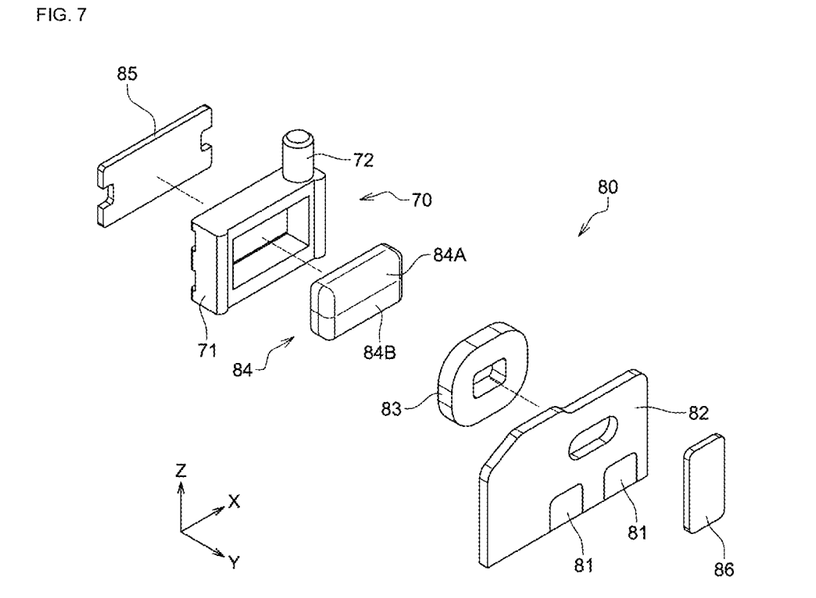
FIG. 7 is an exploded perspective view of a stopper and a voice coil motor included in the blade open-close device in FIG. 1.

As shown in FIG. 2, the base 10 houses a stopper 70 movable in Z-direction and a voice coil motor 80 that moves the stopper 70 in Z-direction. FIG. 7 is an exploded perspective view of the stopper 70 and the voice coil motor 80. As shown in FIG. 7, the stopper 70 includes a rectangular base frame 71 and a protrusion 72 protruding in the positive Z-direction from the base frame 71.

As shown in FIG. 2, the base 10 has an insertion hole 16 through which the protrusion 72 on the stopper 70 is placed. The partition 30 and the cover plate 40 also have insertion holes 33 and 45 through which the protrusion 72 on the stopper 70 is placed. The stopper 70 is housed in the base 10 with the protrusion 72 being placed through the insertion hole 16 in the base 10 and the insertion hole 33 in the partition 30. The stopper 70 is movable within a predetermined range in Z-direction.

The voice coil motor 80 includes a flexible printed circuit board 82 including connectors 81 connected to the module board 2, a coil 83 attached to the flexible printed circuit board 82, a magnet 84 placed in the base frame 71 in the stopper 70, a first yoke 85 attached to the base frame 71 of the stopper 70, and a second yoke 86 fixed to the base 10. The first yoke 85 and the second yoke 86 are formed from a magnetic material. The magnet 84 is adjacent to the coil 83 between the first yoke 85 and the second yoke 86 in Y-direction.

The connectors 81 on the flexible printed circuit board 82 are electrically connected to contacts on the module board 2 with solder joints (not shown). This electrically connects the coil 83 in the voice coil motor 80 to the wiring (not shown) in the module board 2.

The magnet 84 in the voice coil motor 80 is magnetically polarized oppositely in Z-direction. For example, the magnet 84 includes a first portion 84A and a second portion 84B. The first portion 84A has a surface facing the coil 83 magnetically polarized to the south and the opposite surface magnetically polarized to the north. The second portion 84B has a surface facing the coil 83 magnetically polarized to the north and the opposite surface magnetically polarized to the south.

Figure 8A:
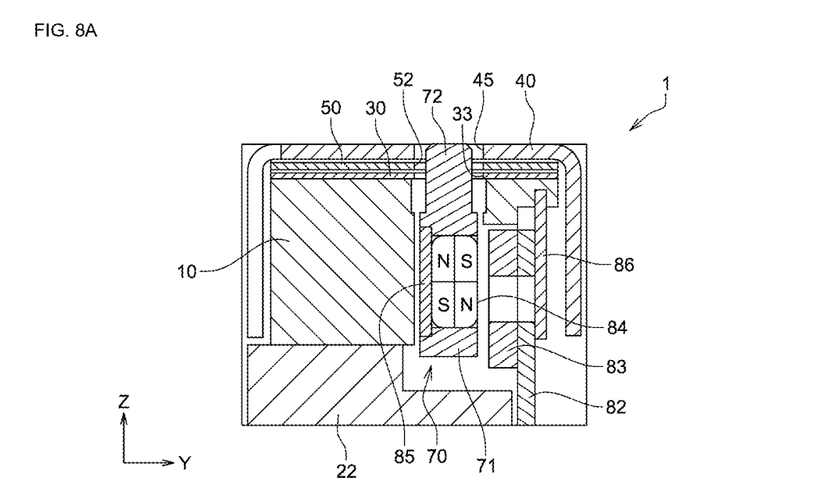
FIG. 8A is a schematic cross-sectional view of the stopper at the position shown in FIG. 1.

FIG. 8A is a schematic cross-sectional view of the stopper 70 at the position shown in FIG. 1. As shown in FIG. 8A, the magnet 84 in the voice coil motor 80 faces the coil 83 in Y-direction. The first yoke 85 faces the coil 83 with the magnet 84 in between. The first yoke 85 allows the magnetic field produced by the coil 83 to act on the magnet 84 efficiently.

The magnet 84 faces the second yoke 86 with the coil 83 in between. Without any current supply to the coil 83 in the voice coil motor 80, the second yoke 86 attracts the magnet 84 under the magnetic force from the magnet 84. As shown in FIG. 8A, the stopper 70 holding the magnet 84 inside is thus lifted in the positive Z-direction by the magnetic attraction. Thus, the second yoke 86 in the present embodiment functions as an urging member that urges the stopper 70 in the positive Z-direction.

As shown in FIG. 2, the blade 50 has an engagement hole 52 and an engagement edge 53 each engageable with the protrusion 72 on the stopper 70. As shown in FIG. 6A, the engagement hole 52 in the blade 50 is above the protrusion 72 on the stopper 70 when the blade 50 is at the opening position. As shown in FIG. 6B, the engagement edge 53 of the blade 50 is located in the positive X-direction from the protrusion 72 on the stopper 70 when the blade 50 is at the closing position.

As described above, without any current supply to the coil 83 in the voice coil motor 80, the magnet 84 attracted to the second yoke 86 lifts the stopper 70 in the positive Z-direction. When the blade 50 is at the opening position as shown in FIG. 6A, the engagement hole 52 in the blade 50 is above the protrusion 72 on the stopper 70, allowing the protrusion 72 on the stopper 70 to protrude upward from the insertion hole 33 in the partition 30 and enter the engagement hole 52 in the blade 50 as shown in FIG. 8A. In other words, the stopper 70 is lifted in the positive Z-direction by the attraction acting on the magnet 84 from the second yoke 86. This moves the protrusion 72 into the engagement hole 52 and onto the path of the blade 50.

In this state, the protrusion 72 on the stopper 70 engaged with the engagement hole 52 in the blade 50 restricts any movement of the blade 50 in X-direction. In other words, the protrusion 72 on the stopper 70 engaged with the engagement hole 52 in the blade 50 retains (locks) the blade 50 at the opening position. The position of the stopper 70 with its protrusion 72 protruding upward from the insertion hole 33 in the partition 30 and located on the path of the blade 50 is hereafter referred to as a lock position.

Similarly, when the blade 50 is at the closing position shown in FIG. 6B, the engagement edge 53 of the blade 50 is located in the positive X-direction from the protrusion 72 on the stopper 70. The protrusion 72 on the stopper 70 thus protrudes upward from the insertion hole 33 in the partition 30 and located on the path of the blade 50. In this state, the protrusion 72 on the stopper 70 engaged with the engagement edge 53 of the blade 50 restricts any movement of the blade 50 in the negative X-direction. The protrusion 72 on the stopper 70 engaged with the engagement edge 53 of the blade 50 thus retains (locks) the blade 50 at the closing position.

In the present embodiment, when the blade 50 is at the opening position or the closing position, the stopper 70 at the lock position has its protrusion 72 engaged with the engagement hole 52 or the engagement edge 53 of the blade 50. This prevents the blade 50 from unintentionally moving from the opening position or the closing position under external vibration or impact, thus reducing malfunctions of the blade open-close device 1.

Figure 8B:
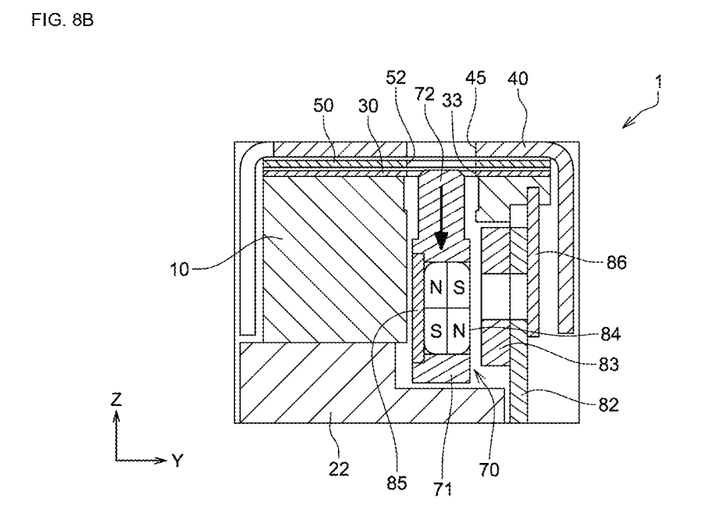
FIG. 8B is a schematic cross-sectional view of the stopper moved from the position shown in FIG. 8A.

To move the blade 50 in X-direction as described above, the coil 83 in the voice coil motor 80 is energized with a current to move the stopper 70 in the negative Z-direction. More specifically, a current flowing through the coil 83 produces a Lorentz force to act on the magnet 84. The Lorentz force moves the stopper 70 holding the magnet 84 inside in the negative Z-direction relative to the coil 83 as shown in FIG. 8B, with the protrusion 72 retracted from the path of the blade 50. The position at which the stopper 70 including the protrusion 72 is entirely retracted downward from the path of the blade 50 is hereafter referred to as an unlock position.

When the stopper 70 is at the unlock position, the protrusion 72 on the stopper 70 is not engaged with the blade 50, allowing the blade 50 to move in X-direction. Thus, after the coil 83 in the voice coil motor 80 is energized with a current to move the stopper 70 to the unlock position, the coil 23 in the actuator 20 may be energized to move the blade 50 from the opening position to the closing position or from the closing position to the opening position. When current supply to the coil 83 in the voice coil motor 80 is stopped after the movement of the blade 50 is complete, the second yoke 86 attracts the magnet 84 to lift the stopper 70 in the positive Z-direction to the lock position. This retains (locks) the blade 50 at the opening position or the closing position with the protrusion 72 on the stopper 70 engaged with the engagement hole 52 or the engagement edge 53 of the blade 50.

In the present embodiment, when the blade 50 is at the opening position and the closing position, the stopper 70 at the lock position restricts the movement of the blade 50 with the protrusion 72. This retains (locks) the blade at the opening position and the closing position. This prevents the blade 50 at the opening position and the closing position from unintentionally moving from the opening position and the closing position under external vibration or impact, thus reducing malfunctions of the blade open-close device 1. To move the blade 50 intentionally, the stopper 70 is moved by the voice coil motor 80 from the lock position to the unlock position to unlock the blade 50. This allows the actuator 20 to move the blade 50 between the opening position and the closing position.

In the present embodiment, the second yoke 86 functions as an urging member that urges the stopper 70 in the positive Z-direction with attraction acting on the magnet 84. The urging member moves the stopper 70 toward the lock position without activation of the voice coil motor 80. This reduces unintentional movement of the blade 50 more effectively. When the urging member is eliminated, the voice coil motor 80 may be activated to move the stopper 70 from the unlock position to the lock position.

The blade 50 may partially block light entering the lens unit 3 through the openings 41 and 31, rather than fully blocking light entering the lens unit 3. To partially block light entering the lens unit 3, for example, the blade 50 may be formed from a material having a low transmittance to light to be captured by the lens unit 3 (e.g., visible light and infrared light), may be colored, or may be patterned with irregularities or holes (e.g., a reticulated or grid pattern and a concentric circle pattern). This causes images or videos captured by the lens unit 3 to be partly unclear or invisible, thus preventing images or videos unintended by the user from being obtained.

In the present embodiment, the yoke 21 in the actuator 20 is shaped as described above, allowing the actuator 20 to retain the blade 50 in position. The blade open-close device 1 further including the above locking structure more reliably reduces unintentional movement of the blade 50.

The blade 50 may have a predetermined optical effect (e.g., a mosaic filter, scattering, and diffuse reflection) to light entering the lens unit 3 through the openings 41 and 31. The blade 50 also causes images or videos captured by the lens unit 3 to be partly unclear or invisible, thus preventing images or videos unintended by the user from being obtained.

At the closing position, the blade 50 has the outer surface exposed outside through the opening 41 in the cover plate 40. The blade 50 may have the outer surface colored with a highly visible color (e.g., red) or designed with, for example, a highly visible geometrical pattern (e.g., a star, a square, a polygon, or stripes), a logo, or an illustration. At the closing position, the blade 50 having the outer surface with a highly visible color or design is easily viewable by the user to allow the user to readily learn about the protection from unintended image or video capturing.

Although the opening 41 in the cover plate 40 and the opening 31 in the partition 30 are circular in the illustrated embodiment, the openings 41 and 31 may be of any shape such as rectangular and elliptical, rather than being circular.

Although the actuator 20 includes the flat U-shaped yoke 21 and the rotor magnet 24 in combination in the above embodiment, the actuator 20 herein is not limited to this structure, and may have any structure that can move the blade 50 between the closing position and the opening position. In some embodiments, a voice coil motor may be used as the actuator 20 to drive the blade 50. For a voice coil motor having a weak retention force for the blade 50, the locking structure in one or more embodiments of the present invention may be used to prevent the blade 50 more reliably from opening unintentionally.

In the above embodiment, the stopper 70 on the path of the blade 50 restricts the movement of the blade 50. In some embodiments, the stopper 70 on a path of the actuator 20 may restrict the movement of the blade 50. For example, the stopper 70 may move between a lock position at which the protrusion 72 is on the path of the lever 25 in the actuator 20 and an unlock position at which the stopper 70 is entirely retracted from the path of the lever 25 in the actuator 20.

In the above embodiment, the stopper 70 moves to the lock position to have the protrusion 72 engaged with and locking the blade 50 both when the blade 50 is at the opening position and when the blade 50 is at the closing position. In some embodiments, the stopper 70 may move to the lock position either when the blade 50 is at the opening position or when the blade 50 is at the closing position. In this case, the stopper 70 may move to the lock position when the blade 50 is at the closing position to prevent images or videos unintended by the user from being captured with the lens unit 3.

Figure 9:
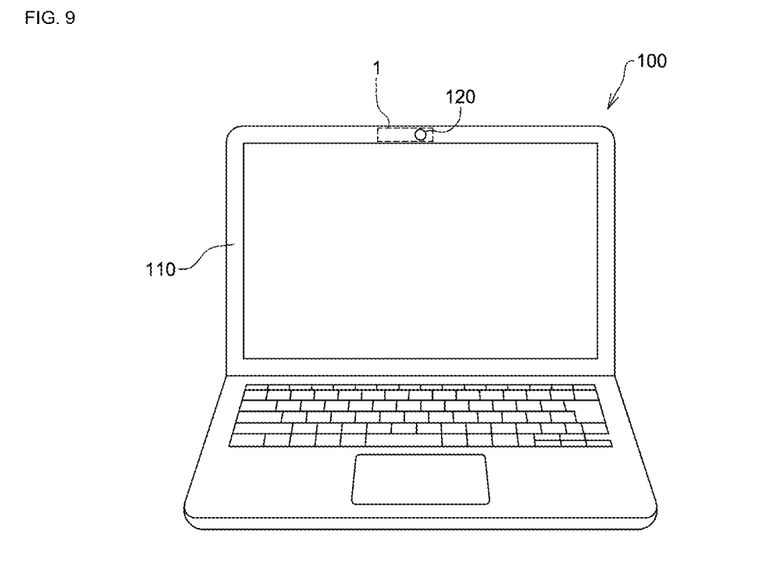
FIG. 9 is a schematic diagram of a laptop personal computer as an electronic device according to one embodiment of the present invention.

FIG. 9 is a diagram of a laptop personal computer 100 as an example electronic device incorporating the above blade open-close device 1. A display 110 of the laptop personal computer 100 has a window 120 for a camera. The blade open-close device 1 is incorporated in the laptop personal computer 100 with the lens unit 3 at a position corresponding to the window 120. This laptop personal computer 100 has the camera function.

Although the electronic device incorporating the blade open-close device 1 is the laptop personal computer 100 in the above example, the blade open-close device according to one or more embodiments of the present invention may be used in many electronic devices having the camera function, such as smart speakers and home security cameras, in addition to laptop personal computers.

For example, when an electronic device such as the laptop personal computer 100 is powered off or the display 110 of the laptop personal computer 100 is closed, the actuator 20 alone may retain the blade 50 in position. When the electronic device is powered on or the display 110 of the laptop personal computer 100 is open, the locking structure described above may be used to lock the blade 50 in position to avoid unintentional movement of the blade 50. In this manner, the locking structure in one or more embodiments of the present invention may be activated or may not be activated depending on the state of the electronic device incorporating the blade open-close device 1 or use of the device.

Although the embodiments of the present invention have been described above, the present invention is not limited to the above embodiments and may be modified variously within the scope of its technical idea.

As described above, a blade open-close device according to a first aspect of the present invention retains a blade at a predetermined position under an external load. The blade open-close device includes a base having a housing space housing a lens unit, a cover plate covering at least part of the base, and a blade located between the base and the cover plate. The cover plate has an opening aligned with an optical axis of the lens unit. The blade is movable between a closing position to cover the opening and an opening position to uncover the opening. The blade open-close device further includes an actuator that moves the blade between the opening position and the closing position, a stopper movable between a lock position at which at least part of the stopper is on a path of the blade or the actuator and an unlock position at which the stopper is entirely retracted from the path at least when the blade is at the opening position or when the blade is at the closing position, and a voice coil motor that moves the stopper at least from the lock position toward the unlock position.

In the structure, when the blade is at the opening position and/or when the blade is at the closing position, the stopper at the lock position restricts the movement of the blade or the actuator. This retains (locks) the blade at the opening position and/or the closing position. This prevents the blade at the opening position and/or the closing position from unintentionally moving from the opening position and/or the closing position under external vibration or impact, thus reducing malfunctions of the blade open-close device. To move the blade intentionally, the stopper is moved by the voice coil motor from the lock position to the unlock position to unlock the blade. This allows the actuator to move the blade between the opening position and the closing position.

The blade open-close device may further include an urging member urging the stopper toward the lock position. The urging member moves the stopper toward the lock position without activation of the voice coil motor. This reduces unintentional movement of the blade more effectively.

The stopper may be movable between the lock position and the unlock position when the blade is at the opening position and when the blade is at the closing position. This structure locks the movement of the blade at both the opening position and closing position.

The stopper may be engageable with the blade or the actuator.

The actuator may include a yoke being flat and U-shaped and including two arms, a coil wound around one of the two arms of the yoke, a rotor magnet rotatably located between the two arms of the yoke, and a lever connected to the rotor magnet and including a connecting part connected to the blade. The blade open-close device including the actuator is compact.

An electronic device according to a second aspect of the present invention includes the blade open-close device described above.

What is claimed is:

1. A blade open-close device, comprising:
a base having a housing space housing a lens unit;
a cover plate covering at least part of the base and having an opening aligned with an optical axis of the lens unit;
a blade located between the base and the cover plate, the blade being movable between a closing position to cover the opening and an opening position to uncover the opening, wherein the blade comprises an engaging hole and an engaging edge portion, and the engaging hole is displaced from the engaging edge portion in movement direction of the blade;
an actuator configured to move the blade between the opening position and the closing position;
a stopper movable between a lock position at which at least part of the stopper is on a path of the blade or the actuator and an unlock position at which the stopper is entirely retracted from the path at least when the blade is at the opening position and when the blade is at the closing position, the stopper is engageable with the blade or the actuator, the stopper is configured to engage with the engaging hole when the blade is at the opening position, and the stopper is configured to engage with the engaging edge portion when the blade is at the closing position; and a voice coil motor configured to move the stopper at least from the lock position toward the unlock position.

2. The blade open-close device according to claim 1, further comprising:

an urging member urging the stopper toward the lock position.

3. The blade open-close device according to claim 1, wherein the actuator includes a yoke being flat and U-shaped and including two arms,
a coil wound around one of the two arms of the yoke,
a rotor magnet rotatably located between the two arms of the yoke, and
a lever connected to the rotor magnet and including a connecting part connected to the blade.

4. An electronic device, comprising:
the blade open-close device according to claim 1.

* * * * *